Patented July 10, 1951

2,559,976

UNITED STATES PATENT OFFICE 2,559,976

RESINOUS REACTION PRODUCT OF AROMATIC AMINE AND MELAMINE-FORMALDEHYDE

Richard Lindenfelser, Stamford, Conn., assignor to American Cyanamid Company, New York, N. Y., a corporation of Maine No Drawing. Application March 26, 1947, Serial No. 737,409

7 Claims. (Cl. 260—67.6)

This invention relates to aminotriazine-aldehyde resins, and, more particularly, it relates to aminotriazine-aldehyde resins modified with a monoamino compound having two aromatic nuclei, and to a process for preparing same.

Aminotriazine aldehyde resins such as melamine-formaldehyde resins have outstanding properties of electrical resistance, heat resistance, and mechanical strength, which render them particularly adaptable for general purposes, and arc-resistant molding compounds. Accordingly, they have found extensive use in this art, and as binders for molding compositions because of these properties. In applications where a high degree of dimensional stability and resistance to cracking around metallic inserts is desired, however, it is the practice to incorporate a modifying agent which is at least miscible, and preferably compatible with the resin, and which, because of its inherent physical properties, overcomes to a considerable extent, the shrinkage tendency of the melamine resin.

Thus, such prior art modifying agents as phenol, cresol, xylenol and paratoluene sulphonamide, or resins prepared from these materials, have been used to modify commercial melamine-formaldehyde resin molding compositions. There are, however, some objections or disadvantages to the use of these materials in certain specific applications. For example, phenol and cresol render the melamine-formaldehyde resin more subject to failure under electrical arc. It has been found that certain aromatic amines are superior modifiers, for although they detract from the excellent color of the melamine resins, they provide molding compositions having excellent molding and mechanical properties combined with good dimensional stability and resistance to cracking around metallic inserts.

In order to obtain optimum physical properties and proper cure the aromatic amine modifier is generally limited to about 30% of the total resin, that is the melamine-formaldehyde resin and modifier combined. When a lesser quantity of these modifiers is used, the improvement in physical properties such as dimensional stability and resistance to cracking around metallic inserts, is not so great, and when an amount substantially more than 30% of modifier is used, the compounds lack proper cure. In any event, it is not advisable that the modifier constitute more than 45% of the total resin. These compounds have been made in a variety of ways, and used alone or compounded with inert fillers by a number of different processes to provide molding compositions having desirable properties for certain applications. These melamine molding resins have been satisfactorily modified with aniline to produce compounds suitable for certain applications, but aniline is a highly reactive material, and imparts a rather stiff flow and stiff set to molding compounds, and, as such, is not the most desirable for certain applications. Molding resins of this type have also been modified with ortho-aminodiphenyl in molar ratios greater than 1:1, such as 4 mols of ortho-aminodiphenyl per mol of melamine to impart a highly thermoplastic property to the molding composition. It has now been found, as described hereinbelow, and forming a basis of this invention, that by modifying the thermosetting aminotriazine aldehyde resins, such as the melamine-formaldehyde resins with a mono amine having two aromatic nuclei, molding compositions are obtained having excellent physical characteristics, due to the reduced reactivity and the superior plasticity characteristics imparted.

As examples of such mono amine modifying agents there may be mentioned the naphthylamines such as alpha-naphthylamine and beta-naphthylamine, and the aminodiphenyls such as ortho-aminodiphenyl. Since it is desirable to have about 30% modifying agent, the molar ratio of modifying agent to melamine should be about 0.5, and in no case should it be more than 1:1. The modifying agent may be co-reacted with the melamine-formaldehyde resin in appropriate molar proportions to provide the desired molding compositions; or, alternatively, a melamine-formaldehyde resin having a high molar ratio of modifying agent may be prepared, and this resin blended with an unmodified melamine-formaldehyde resin in suitable quantities to provide a final composition containing the proper ratio of modifying agent to melamine in the total blend. Likewise, the modifying amine may be reacted with part of the aldehyde to form a resin which is reacted with the melamine resin in syrup form or by dry blending on heated rolls.

The following examples illustrate some of the various methods of resin preparation and compounding; it being understood, however, that the examples are wholly by way of illustration, and not by way of limitation.

EXAMPLE 1

Five hundred seventy-five (575) gms. of melamine and 920 gms. of 37% formalin were charged into a stainless steel kettle equipped for reflux and vacuum concentration, and the pH of the mixture was adjusted to 6.8 with 2 N NaOH (bromthymol blue indicator). The slurry was then heated to reflux in 30 minutes and held at reflux until the resin syrup cleared and finally a 2 drop sample caused a permanent cloud when shaken with 10–15 cc. of ice water. At this point, the pH was raised to 8.3 with 2 N NaOH (phenol red indicator) and the resin temperature was lowered to about 57° C. The reaction kettle was sealed, a vacuum of 60 cm. (Hg) was applied and distillation begun. After concentrating for 90 minutes under vacuum, the batch temperature had risen to 75° C. The vacuum was released and 385 gms. of ortho-aminodiphenyl were added. The kettle was again sealed and after stirring for a few minutes, the concentration was resumed at 52 cm. (Hg) vacuum. After 60 minutes, the batch temperature had risen to 100° C. and the resin was poured from the kettle into shallow stainless steel trays and cooled. This resin was pulverized and 40 parts were blended in the well known manner for the preparation of molding compounds with 60 parts of silica flour and 1 part of zinc stearate. The granular molding compound was found to have the properties illustrated in the table hereinbelow.

EXAMPLE 2

One thousand one-hundred and five (1105) gms. of molten ortho-aminodiphenyl and 530 gms. of formalin were charged into a stainless steel reaction kettle equipped for high temperature concentration and heated to 70° C. in 25 minutes. Six and five tenths (6.5) gms. of concentrated sulfuric acid dissolved in 124.5 gms. of water were then added and the heating continued to reflux. The resin was held under reflux for 60 minutes and then the kettle was sealed and the resin dehydrated under a gradually advancing vacuum. After about 130 minutes, the temperature was at 150° C. and the vacuum at 72 cm. of (Hg). The resin was poured into steel trays and was a straw colored clear brittle solid. Eight hundred (800) gms. of this resin was heated to 100° C. and 18 cc. of 2.2 N NaOH solution were thoroughly admixed. The melt was poured and cooled to a brittle slightly cloudy straw colored resin. Twelve (12) parts of this resin were blended with 28 parts of a spray dried melamine-formaldehyde resin having a molar ratio of 1.0 mol of melamine to 2.0 mols of formaldehyde, 60 parts of silica flour and 1.0 part of zinc stearate in the well known process for preparing molding compounds and had the properties illustrated in the table hereinbelow.

EXAMPLE 3

A resin was prepared by a process similar to Example 1, using 1850 gms. of melamine, 2975 gms. of formalin and 1050 gms. of alpha-naphthylamine. The final resin temperature was 110° C. at 42 cm. of vacuum. The resin was compounded as in Example 1, and had the properties shown in the table hereinbelow.

EXAMPLE 4

A resin was prepared from 1075 gms. of β,naphthylamine and 610 gms. of formalin by a process similar to Example 2. After an initial exothermic reaction, 6.5 gms. of concentrated sulfuric acid in 123.5 gms. of water were added and the mixture was refluxed for 2½ hours. The resin was then dehydrated under vacuum, and the final resin temperature was 155° C. at 72 cm. The resin was a brittle clear amber colored solid. It was compounded as in Example 2 and had the properties shown in the table hereinbelow.

EXAMPLE 5

A spray dried molding compound was prepared by the following method: Thirty-six (36.0) pounds of ortho-aminodiphenyl, 17.4 pounds of formalin and 2.1 pounds of 28% ammonium hydroxide were charged to a stainless steel reaction kettle and heated to reflux in 30 minutes. The mixture was agitated under reflux for 60 minutes and then cooled to 85° C. in 10 minutes. Sixty-seven and two tenths (67.2) pounds of melamine, 85.5 pounds of formalin and 0.8 pound of MgO were added and the pH was adjusted to 8.4. The mixture was held at 85° C. for 10 minutes and then cooled to 70°–80° C. Ninety-five (95.0) pounds of 200 mesh alpha-cellulose and 371 pounds of water were added slowly and simultaneously with good agitation so that a smooth slurry was formed. Finally, 2.4 pounds of zinc stearate dissolved in 7.2 pounds of ethanol were added, and the whole agitated until smooth. The mixture was then pumped to a rotary spray head at the rate of 4.0 pounds per minute and sprayed into a chamber heated to 650° F. The product was collected and found to be a uniform finely divided powder. It was passed through a micropulverizer and then compression molded, and produced articles of good molded appearance and having the properties illustrated in the table hereinbelow.

When preparing molding compounds by the rolling process (i. e. densification on a 2 roll mill), it has been found that melamine resin modified with ortho-aminodiphenyl has a tendency to crumble and fall off the rolls. However, this may be overcome by incorporating a small amount of furfural in the resin.

EXAMPLE 6

One hundred ninety-three (193) pounds of ortho-aminodiphenyl were charged to a stainless steel reaction kettle equipped for reflux and vacuum concentration and heated to 40° C. Ninety-two and two tenths (92.2) pounds of formalin (37% formaldehyde) were added slowly, followed by 10.4 pounds of ammonium hydroxide. The mixture was slightly exothermic, and cooling water was circulated in the jacket during the addition. The mixture was heated to reflux in 30 minutes, and heated under reflux for 60 minutes. At the end of this time, the batch was cooled to 85°–80° C. and there were added 360 pounds of melamine, 460 pounds of formalin and 4.0 pounds of MgO. The pH of the mixture was 8.0–8.5. The kettle was closed and the resin concentrated under 20½″ (Hg) vacuum. After about 45 minutes of concentration, 275 pounds of distillate had been collected. The kettle was opened and 38.5 pounds of furfural were added. Concentration was resumed immediately, and continued until the resin temperature was near 100° C. This required about 30 minutes from the point of addition of the furfural. The resin was then dumped into shallow stainless steel trays and cooled rapidly to room temperature. This resin was compounded in the following formulations on a 2 roll mill at about 110° C., and had the properties illustrated in the table hereinbelow:

6A

| | Parts |
|---|---|
| Resin of Example 6 | 45 |
| Anthophyllite asbestos | 41.25 |
| Cotton flock | 13.75 |
| Benzoyl phthalimide | 0.45 |
| Zinc stearate | 1.00 |

6B

| | Parts |
|---|---|
| Resin of Example 6 | 60 |
| Cellulose pulp 60 mesh | 40 |
| Zinc stearate | 1.0 |

*Comparison of molding compositions of the invention with commercial melamine molding compositions molded at 150° C. and 3500 P. S. I. for 5 minutes*

| Example No. | Filler | Impact Strength, Izod | Shrinkage | | Dielectric Strength Short Time at— | | Arc Resistance, Ave. | Dissipation Factor | Dielectric Constant |
|---|---|---|---|---|---|---|---|---|---|
| | | | 4 x 1/8" Mold | Disk [1] | 100° C. | 25° C. | | | |
| | | Ft. lbs. per in. | Mils per inch | Mils per inch | Volts per mil | Volts per mil | Secs. | | |
| 1 | Silica Flour | 0.339 | 5.7 | 1.8 | 680 | 600 | 136 | .008 | 4.4 |
| 2 | do | 0.269 | 4.5 | 1.5 | 590 | 510 | 150 | | |
| 3 | do | 0.330 | 5.3 | 1.5 | >650 | 590 | 178 | .007 | 4.5 |
| 4 | do | 0.289 | 7.0 | 0.3 | 500 | 570 | 170 | .01 | 4.9 |
| 6A | Asbestos Cotton Flock | [2] 0.230 | 4.2 | 1.7 | 290 | | 175 | | |
| Commercial Melamine Molding Compound. | Mineral Filled | 0.326 | 6.0 | 2.7 | 490 | 535 | 133 | .04 | 6.7 |
| 5 | Cellulose Pulp | [2] 0.132 | 5.9 | 2.3 | 300 | | 126 | | |
| 6B | do | [2] 0.310 | 4.1 | 1.6 | 270 | | 122 | | |
| Commercial Melamine Molding Compound. | Wood Filled | [2] 0.122 | 7.5 | 4.1 | 490 | | 100 | | |

[1] Shrinkage of the molded article is determined by comparing the measurement of the diameter of the molded disc immediately after molding with the diameter of the mold. These differences are shown in the first column under "shrinkage." The discs are then subjected to baking for a 48 hour period at 220° F. and the molded disc diameter measurements are then contrasted with the molded disc diameter measurements taken before the baking treatment. These differences are set forth in column 2 under "shrinkage."

[2] These values are "ski ball" impact and are determined in accordance with the method outlined in the article "Ball Impact Tester for Plastics," A. S. T. M. Bulletin, October 1944, 130.

In preparing the products of the present invention, the relative proportions of the reactants may vary over a substantial range. While it is theoretically possible to react 6 mols of formaldehyde with 1 mol of melamine in carrying out the process of the present invention, it is generally advantageous to react essentially not over 4 mols of formaldehyde with each mol of melamine, in order to avoid the production of a resin which is too reactive to conveniently process. Likewise, it is desirable to have a molar ratio of formaldehyde to melamine of at least 1:1, and, in general, the melamine-formaldehyde ratio should be at least 1.5 mols of formaldehyde per mol of melamine. The quantity of mono-amino modifying agent may be used in amounts as low as 10%, based on the weight of the total resin formulation, for some specific applications with particular resins; but, as previously stated, it is preferable to use between 30 and 45% modifying agent. The practical upper limit of the mono-amino modifying agent is approximately 1 mol of modifying agent per mol of melamine, as amounts of modifying agent above this ratio impart different properties to the resin, and prevent proper cure of the resin, which properties are undesirable for the applications requiring outstanding electrical resistance, heat resistance, arc resistance, mechanical strength and having excellent dimensional stability.

In preparing molding compositions from the resins of this invention, various inert fillers, colorants, lubricants and catalysts may be incorporated in the molding composition.

I claim:

1. A resinous composition comprising the fusible heat reaction product of a primary monoamine selected from the group consisting of alpha naphthylamine, beta naphthylamine, and o-aminodiphenyl and a thermosetting melamine-formaldehyde resin wherein the mol ratio of the monoamine to melamine is about 0.5:1, respectively.

2. A resinous composition comprising the fusible heat reaction product of a primary monoamine selected from the group consisting of alpha naphthylamine, beta naphthylamine and o-aminodiphenyl and a thermosetting melamine-formaldehyde resin in which the mol ratio of melamine to formaldehyde is 1:1.5 to 1:4, respectively and in which the mol ratio of primary monoamine to melamine is about 0.5:1, respectively.

3. A resinous composition comprising the fusible heat reaction product of alpha naphthylamine and a thermosetting melamine-formaldehyde resin in which the ratio of melamine to formaldehyde is 1:1.5 to 1:4, respectively and in which the mol ratio of alpha naphthylamine to melamine is about 0.5:1, respectively.

4. A resinous composition comprising the fusible heat reaction product of beta naphthylamine and a thermosetting melamine-formaldehyde resin in which the ratio of melamine to formaldehyde is 1:1.5 to 1:4, respectively and in which the mol ratio of beta nephthylamine to melamine is about 0.5:1, respectively.

5. A resinous composition comprising the fusiable heat reaction product of o-aminodiphenyl and a thermosetting melamine-formaldehyde resin in which the ratio of melamine to formaldehyde is 1:1.5 to 1:4, respectively and in which the mol ratio of ortho aminodiphenyl to melamine is about 0.5:1, respectively.

6. A process for the preparation of a resinous composition comprising heat reacting a primary monoamine selected from the group consisting of alpha naphthylamine, beta naphthylamine and o-aminodiphenyl and a thermosetting melamine-formaldehyde resin wherein the mol ratio of primary monoamine to melamine is about 0.5:1, respectively.

7. A process for the preparation of a resinous composition comprising heat reacting a primary monoamine selected from the group consisting of alpha naphthylamine, beta naphthylamine, and o-aminodiphenyl and a thermosetting melamine-formaldehyde resin in which the mol ratio of melamine to formaldehyde is 1:1.5 to 1:4, respectively and in which the mol ratio of primary monoamine to melamine is about 0.5:1, respectively.

RICHARD LINDENFELSER.

REFERENCES CITED

The following references are of record in the file of this patent:

UNITED STATES PATENTS

| Number | Name | Date |
|---|---|---|
| 1,982,486 | Schlingman | Nov. 27, 1934 |
| 2,009,173 | Gams et al. | July 23, 1935 |
| 2,101,215 | Graves et al. | Dec. 7, 1937 |
| 2,331,446 | Widmer et al. | Oct. 12, 1943 |
| 2,409,906 | Scott | Oct. 22, 1946 |
| 2,432,544 | Rhodes | Dec. 16, 1947 |

FOREIGN PATENTS

| Number | Country | Date |
|---|---|---|
| 426,323 | Great Britain | of 1935 |
| 502,720 | Great Britain | Mar. 23, 1939 |